United States Patent
Liao et al.

(10) Patent No.: US 9,313,054 B1
(45) Date of Patent: Apr. 12, 2016

(54) CIRCUITS FOR AND METHODS OF FILTERING INTER-SYMBOL INTERFERENCE FOR SERDES APPLICATIONS

(71) Applicant: Xilinx, Inc., San Jose, CA (US)

(72) Inventors: Yu Liao, Longmont, CO (US); Hongtao Zhang, San Jose, CA (US); Geoffrey Zhang, San Jose, CA (US); Kun-Yung Chang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/617,015

(22) Filed: Feb. 9, 2015

(51) Int. Cl.
*H03H 7/30* (2006.01)
*H04L 25/03* (2006.01)

(52) U.S. Cl.
CPC .................. *H04L 25/03267* (2013.01)

(58) Field of Classification Search
None
See application file for complete search history.

(56) References Cited

U.S. PATENT DOCUMENTS

| | | | | |
|---|---|---|---|---|
| 2004/0053588 | A1* | 3/2004 | Yang ...................... | H04B 7/005 455/137 |
| 2005/0084028 | A1* | 4/2005 | Yu ...................... | H04L 25/03057 375/267 |
| 2008/0192859 | A1* | 8/2008 | Foley ...................... | H04L 25/085 375/296 |

OTHER PUBLICATIONS

Murphy, Cathal, *Efficient Implementation of Analog Signal Processing Functions in Xilinx All Programmable Devices*, WP442 (v1.0), Nov. 18, 2013, pp. 1-14, Xilinx, Inc., San Jose, California, USA.
Lund, Kraig et al. *Virtex-5 FPGA Integrated Endpoint Block for PCI Express Designs: DDR2 SDRAM DMA Initiator Demonstration Platform*, XAPP859 (v1.1), Jul. 31, 2008, pp. 1-63, Xilinx, Inc., San Jose, California, USA.
Sarmah, Mrinal J. et al., *Implementation of Signal Processing IP on Zynq-7000 AP SoC to Post-Process XADC Samples*, XAPP1203 (v1.0), Apr. 22, 2014, pp. 1-14, Xilinx, Inc., San Jose, California, USA.

* cited by examiner

*Primary Examiner* — Adolf DSouza
(74) *Attorney, Agent, or Firm* — John J. King

(57) ABSTRACT

A circuit for filtering inter-symbol interference in an integrated circuit is described. The circuit comprises a first stage coupled to receive digital samples of an input signal. The first stage generates first decision outputs based upon the digital samples. A second stage is coupled to receive the digital samples of the input signal. The second stage comprises a filter receiving the first decision outputs and generating second decision outputs based upon the digital samples of the input signal and detected inter-symbol interference associated with the first decision outputs. A method of filtering inter-symbol interference in an integrated circuit is also described.

19 Claims, 7 Drawing Sheets

CIRCUITS FOR AND METHODS OF FILTERING INTER-SYMBOL INTERFERENCE FOR SERDES APPLICATIONS

TECHNICAL FIELD

The present invention relates generally to integrated circuit devices, and in particular, to circuits for and methods of filtering inter-symbol interference in an integrated circuit.

BACKGROUND

High speed serial link communications are an important function of many integrated circuits and systems. However, implementing high speed serial link communications also provides many challenges. For example, a 56 gigabyte per second (Gb/s) serializer/deserialzer (SerDes) circuit implemented in a data transmission channel having high loss requires sophisticated equalization to achieve a targeted error rate. In conventional devices, the equalization is done with a FFE (Feed Forward Equalizer) to cancel out pre-cursor inter-symbol interference (ISI) and a Decision Feedback Equalizer (DFE) to cancel out residual post-cursor ISI. However, conventional circuits implementing the FFE and DFE equalization can only support a few DFE taps, due to limitations in implementing the DFE in an integrated circuit. Because of the feedback loop in DFE, loop unrolling is necessary to achieve a high data rate. Further, as the number of DFE taps increases, the critical path length increases, and the complexity of the loop unrolling of the DFE also increases exponentially. To support even higher data rates and more challenging transmission channels, improved circuits implementing FFE and DFE equalization is necessary.

Accordingly, improved circuits and methods for filtering inter-symbol interference in an integrated circuit would be advantageous.

SUMMARY

A circuit for filtering inter-symbol interference in an integrated circuit is described. The circuit comprises a first stage coupled to receive digital samples of an input signal, wherein the first stage generates first decision outputs based upon the digital samples; and a second stage coupled to receive the digital samples of the input signal, wherein the second stage comprises a filter receiving the first decision outputs and generating second decision outputs based upon the digital samples of the input signal and detected inter-symbol interference associated with the first decision outputs.

Another circuit for filtering inter-symbol interference in an integrated circuit comprises a decision feedback equalizer coupled to receive digital samples of an input signal, wherein the decision feedback equalizer generates first decision outputs based upon the digital samples; a feed forward equalizer coupled to receive the first decision output and to generate detected inter-symbol interference associated with the first decision outputs; a pre-filter coupled to receive delayed digital samples of the input signals; a first subtractor circuit coupled to output of the pre-filter and the feed forward equalizer; and a decision block coupled to an output of the subtractor circuit, the decision block generating second decision outputs.

A method of filtering inter-symbol interference in an integrated circuit is also described. The method comprises receiving digital samples of an input signal at a first stage; generating first decision outputs of the first stage based upon the digital samples; receiving the digital samples of the input signal at a second stage; generating second decision outputs based upon the digital samples of the input signal and detected inter-symbol interference associated with the first decision outputs.

DETAILED DESCRIPTION

The circuits and methods set forth below enable pre-cursor and post-cursor ISI cancellation to improve the equalization of high speed serial data applications. More particularly, the circuits and methods cancel out pre-cursor and post-cursor ISI by a first partial equalization of an ISI impaired signal, and then a subtraction of the estimated pre-cursor and post-cursor ISI from filtered decisions from another separate detector. A pre-filter that filters analog-to-digital converter (ADC) samples is combined with a decision FIR (Finite Impulse Response) filter that processes decisions from a low complexity detector to generate the estimation of pre-cursor and post-cursor ISI. By implementing joint and independent pre-filter and decision filter adaptations, the resulting equalized samples have reduced noise and residual ISI, which enables improved equalization.

The circuits and methods reduce the critical path length by not having a feedback loop in pre-cursor and post-cursor ISI cancellation, because the decisions are generated by a low complexity detector. The circuits and methods also reduce noise in equalized samples, because the decision FIR works on both pre-cursor and post-cursor so that the pre-filter does not need to do as much high frequency boost as compared to an FFE in conventional DFE implementation, where only the post-cursors are cancelled out by the decisions. Further, the circuits and methods reduce residual ISI in equalized samples, because longer pre-cursor taps and post-cursor taps can be supported compared with a conventional DFE. As a result, the circuits and methods support higher data rate serial link communications and enable data transmission in more challenging channels compared to conventional DFE implementations.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
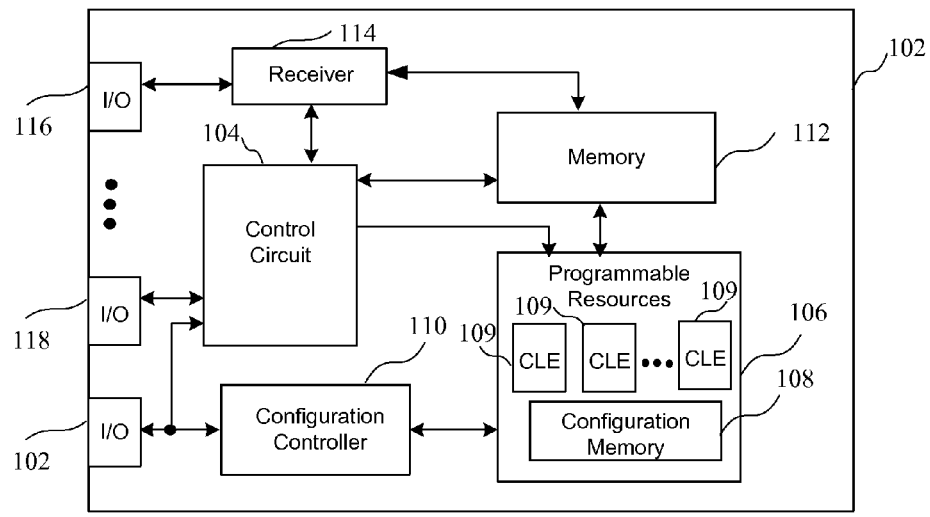
FIG. 1 is a block diagram of an integrated circuit having a circuit for filtering inter-symbol interference.

Turning now to FIG. 1, a block diagram of an integrated circuit having a circuit for filtering inter-symbol interference is shown. In particular, an input/output port 102 is coupled to a control circuit 104 that controls programmable resources 106 having configuration memory 108. Configuration data, described in more detail below in reference to FIGS. 8-10, may be provided to the configuration memory 108 by a configuration controller 110. The configuration data enables the operation of configurable elements 109, also described in more detail in reference to FIG. 10. A separate memory 112, which may be a non-volatile memory for example, may be coupled to the control circuit 104 and the programmable resources 106. A receiver 114 may be coupled to the control circuit 104 and the memory 112, and may receive signals external to the integrated circuit device or transmit signals by way of an I/O port 116. As will be described in more detail below, the receiver 114 enables filtering inter-symbol interference in an integrated circuit, and may be implemented in the programmable logic device (PLD) of FIG. 9. Other I/O ports may be coupled to circuits of the integrated circuit device, such as I/O port 118 that is coupled to the control circuit 104 as shown. The circuits and methods set forth in more detail below may be implemented within a single integrated circuit die, or may be implemented in a multi-chip module or some other system implementing CML circuits.

Figure 2:
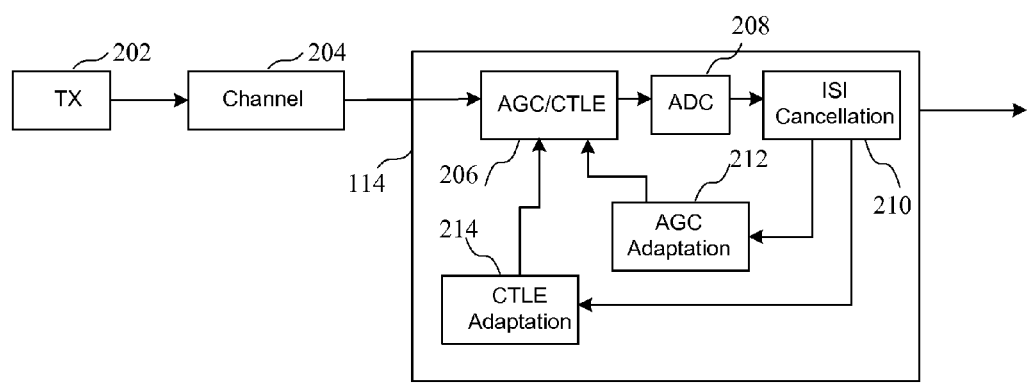
FIG. 2 is a block diagram of a transmission network having a receiver for filtering inter-symbol interference.

Turning now to FIG. 2, a block diagram of a transmission network having a receiver for filtering inter-symbol interference is shown. In particular, a transmitter 202 is coupled to a channel 204 providing data to the receiver 114. The data channel could be any type of wired or wireless communication channel. The receiver 114 comprises an automatic gain control/continuous time linear equalizer (AGC/CTLE) circuit 206 coupled to the channel 204, and output of which is coupled to an analog-to-digital (ADC) converter 208. The AGC/CTLE circuit ensures that the amplitude of the received signal is appropriate, and equalizes the combined characteristics of the transmitter and the channel. The ADC converts the analog input signal coupled to the receiver 114 to digital samples which are coupled to an ISI cancellation circuit 210. An AGC adaptation circuit 212 and a CTLE adaptation circuit 214 enable adjustments of the AGC/CTLE circuit 206 based upon outputs of the ISI cancellation circuit 210 to correctly receive the analog signal. The ISI cancellation circuit 210 will be described in more detail in reference to FIGS. 3 and 4.

Figure 3:
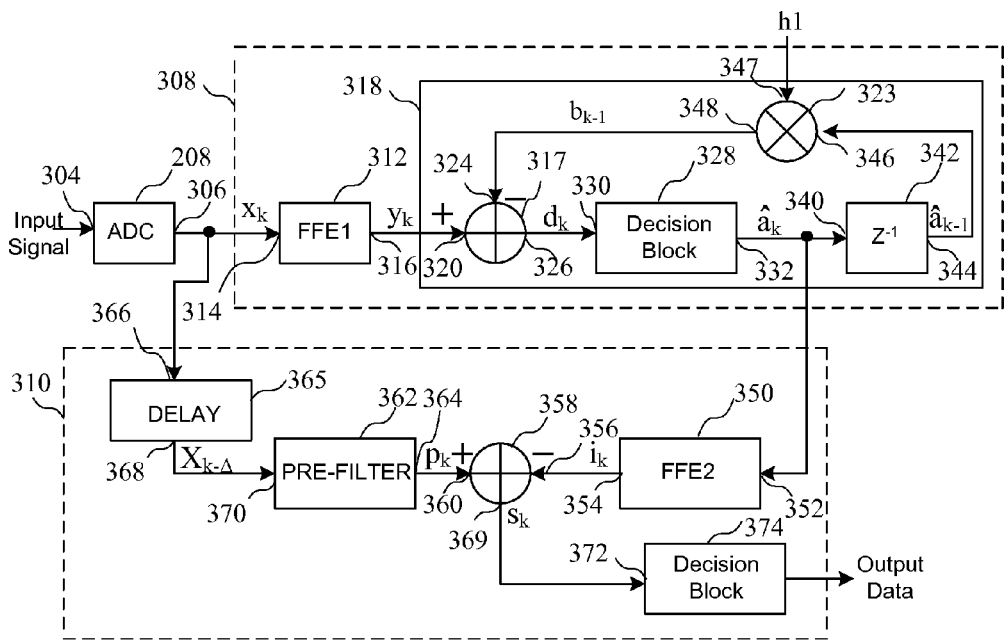
FIG. 3 is a block diagram of a portion of an example receiver enabling the cancellation of inter-symbol interference.

Turning now to FIG. 3, a block diagram of a portion of a receiver enabling the cancellation of inter-symbol interference is shown. The analog-to-digital converter 208 is coupled to receive the input signal, which may be generated by the AGC/CTLE circuit 206 for example at an input 304, and generates digital samples at an output 306. The output 306 is coupled to a first stage 308 of the ISI cancellation circuit 210 that enables filtering inter-symbol interference. As will be described in more detail below, the digital samples at the output 306 and first decision outputs of the first stage 308 are coupled to a second stage 310.

The first stage 308 comprises a first FFE 312, coupled to receive the digital samples $x_k$ at an input 314. The FFE 312 cancels out pre-cursor ISI and generates a filtered signal $y_k$. The FFE may implement a finite impulse response (FIR) filter for example. An output 316 of the FFE 312 is coupled to a DFE 318. The DFE 318 comprises a first subtractor circuit 317 coupled to receive an output of the first FFE 312 at a first input 320. A feedback output $b_{k-1}$ from a multiplier 323 is coupled to a second input 324. The output $d_k$ at an output 326 of the subtractor circuit is coupled to a decision block 328 at an input 330, where a first stage decision $â_k$ is generated at an output 332. The decision block 328, also commonly called a slicer, determines the value of the data signal (for example, "1" or "−1" for NRZ modulation). The first decisions generated at the output 332 are coupled to an input 340 of a delay element 342, where a delayed decision $â_{k-1}$ at an output 344 is coupled to a first input 346 of the multiplier 323. The first decisions generated by the decision block 328 represent estimates of the received digital data, where the estimates are used by the second stage to provide second decisions, which represent the actual output data of the receiver and are more accurate than the first decisions. A value h1 is also coupled to a second input 347 of the multiplier 323. An output 348 is coupled to the input 324 of the subtractor circuit 317, where the output of the multiplier 323 is subtracted from the output of the FFE 312. The value h1 is the DFE coefficient, which is an estimation of the residual post-cursor ISI at the output of the FFE 312, and can be updated periodically to enable the DFE circuit to cancel out post-cursor ISI.

Figure 5:
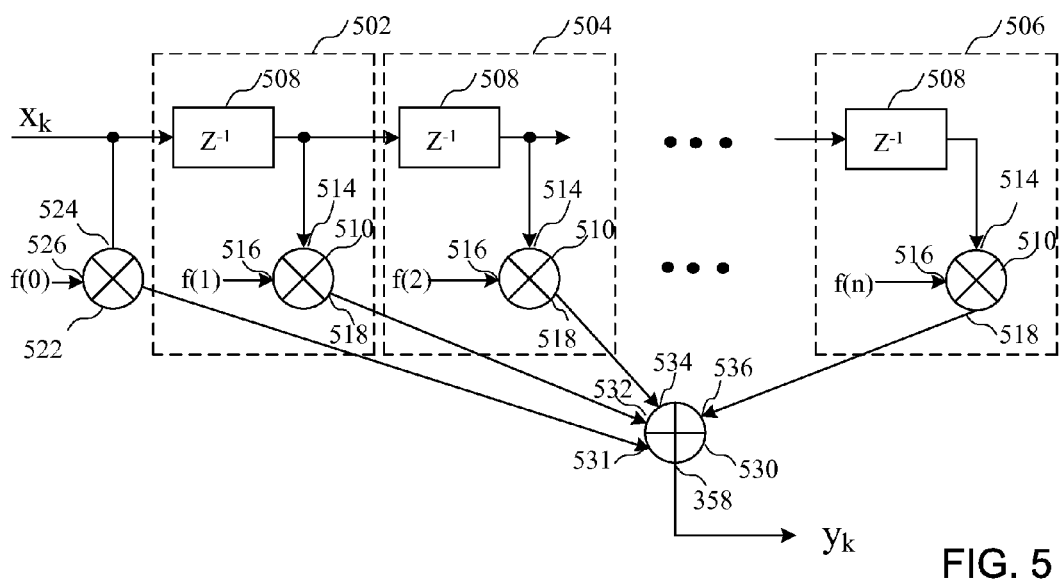
FIG. 5 is a block diagram of an example implementation a feed forward equalizer of FIGS. 3 and 4.

The first decision outputs of the first stage are also coupled to a second FFE 350 at an input 352. A filtered value $i_k$ (which represents the estimation of both pre-cursor and post-cursor ISI of the pre-filter 362 output) generated at the output 354 of the second FFE 350 is coupled to a first input 356 of a second subtractor circuit 358. The second input 360 of the second subtractor circuit 358 is also coupled to a pre-filter 362 at an output 364, where the pre-filter 362 receives a delayed output of the ADC circuit 208 from a delay circuit 365 and generates a filtered output $p_k$. That is, the digital samples at the output 306 are coupled to an input 366 of the delay circuit 365, where delayed digital samples at the output 368 are coupled to an input 370 of the pre-filter 362. As described in more detail in reference to FIGS. 4 and 5, at time k the $i^{th}$ pre-filter coefficient $f(i)^k$ is updated according to the equation:

$$f(i)^k = f(i)^{k-1} - \mu \cdot e_k \cdot x_{k-i}, \quad (1)$$

wherein μ is a weighting factor controlling the speed of the adaptation, $e_k$ is the error at time k and given by $$e_k = S_k - \hat{S}_k, \quad (2)$$

with $$S_k = p_k - i_k \quad (3)$$

and $\hat{s}_k$ the estimated symbol based on $s_k$ given by the following equation $$\hat{S}_k = a_k' * h_0 \quad (4)$$

where $a_k'$ is the decision of the transmitted symbol $a_k$ based on $s_k$, and $h_0$ scales the signal to desired amplitude. The value $x_{k-i}$ is the digital sample multiplied with the $i^{th}$ coefficient $f(i)^{k-1}$. The pre-filter generates an output as shown in FIG. 5 according to the equation:

$$p_k = f_0 \cdot x_k + f(1)x_{k-1} + \ldots + f(n)x_{k-n}. \quad (5)$$

The FFE 350 operates according to the same equations, where $\hat{a}_k$ is substituted for $x_k$. An output 369 of the subtractor circuit 358 is coupled to a second decision block 374 at an input 372, where the second decisions generated by the decision block 374 comprise the improved estimation of the transmitted data, which are the final decisions of the receiver.

In the implementation of FIG. 3, the pre-filter 362 and the FFE 350 operate in the digital domain. The first stage 308 implements initial decision feedback equalization. That is, ADC samples are filtered by the FIR filter of the FFE 312 to remove most pre-cursor ISI. The residual post-cursor ISI is generated by scaling the delayed feedback decision with a scalar h1 using the multiplier 323 and the delay element 342. With the residual post-cursor ISI subtracted from the output of the FFE 312, the equalized sample at the output 326 of the subtractor 317 is coupled to the decision block 328 to generate the first decisions.

The first decisions are then filtered by the decision FFE 350 to generate the estimation of the residual pre-cursor and post-cursor ISI at the output of the pre-filter. The FFE 350 may also implement a FIR filter. The pre-filter 362 is a second digital FIR which does partial equalization of the signal, and noise shaping. The delay before the pre-filter is provided to align the pre-filter output with the filtered decisions from FFE 350. Because there is no feedback loops in the equalization path of pre-filter and FFE2, the equalization technique of FIG. 4 can achieve higher a data rate compared to a conventional decision feedback equalization technique having feedback loops. Also, because the equalization technique uses decisions to cancel out both pre-cursor and post-cursor ISI using the first stage decisions, the pre-filter requires less noise enhancement compared to conventional decision feedback equalization techniques, where only post-cursor ISI is cancelled using decisions and a number of ISI taps is limited due to implementation complexity and silicon circuit speed constraints.

Figure 4:
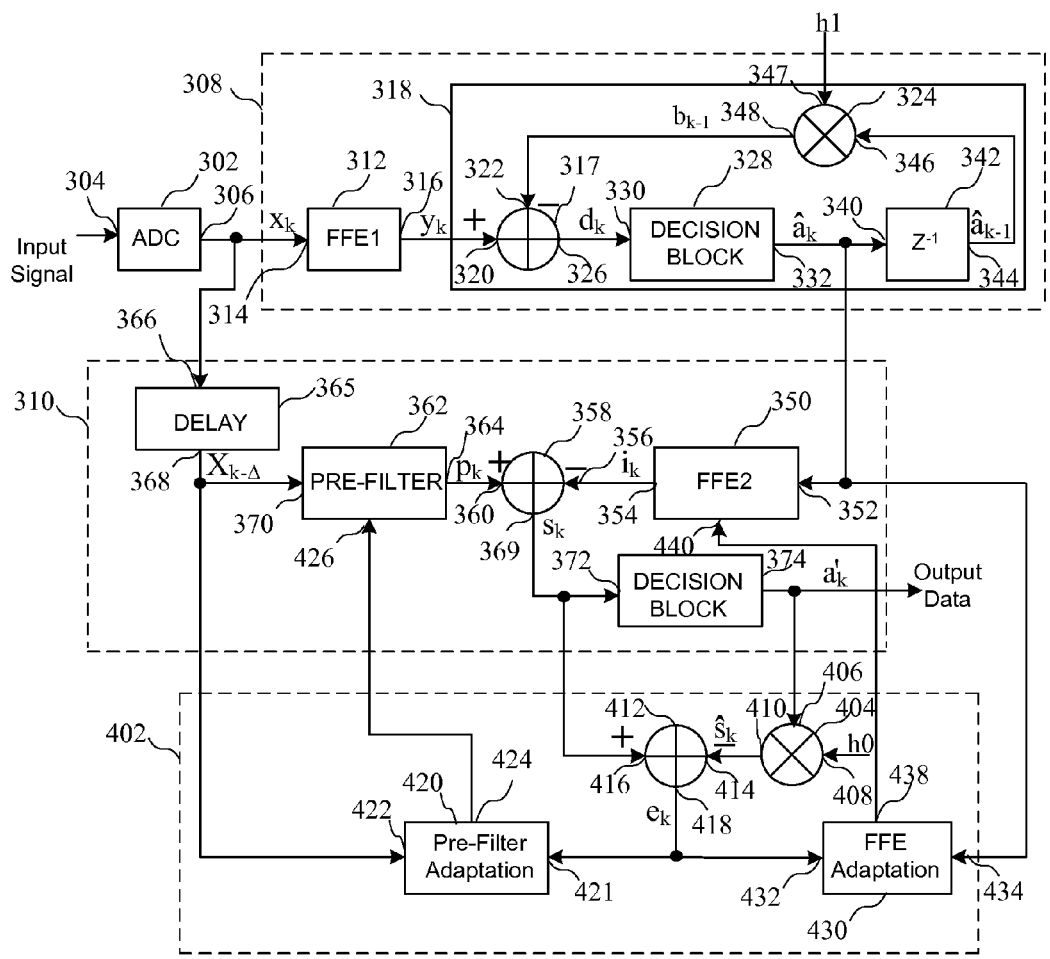
FIG. 4 is another block diagram of a portion of a receiver enabling the adaptation of the cancellation of inter-symbol interference.

Turning now to FIG. 4, another block diagram of a portion of a receiver enabling the adaptation of the cancellation of inter-symbol interference is shown, where the circuit of FIG. 4 provides joint adaptation of the pre-filter and the FFE 350. In addition to the first stage 308 and the second stage 310, an adaptation stage 402 enabling pre-filter adaptation and FFE adaptation is also implemented. In particular, a multiplier 404 is coupled to receive the second output decisions at an input 406 and a value h0 representing the signal level at an input 408, the output of which is an estimation of the transmitted symbol. An output of the multiplier 404 generated at an output 410 is coupled to a third subtractor circuit 412 at an input 414, while the output of the second subtractor circuit 358 is coupled to an input 416 of the third subtractor circuit. An output of the subtractor generated at an output 418 is coupled to pre-filter adaptation circuit 420 at an input 421, while the delayed output signal of the delay element 365 is coupled to a second input 422 of the pre-filter adaptation circuit 420. Adapted pre-filter coefficients are provided to the pre-filter 362 to update its coefficients at programmable frequency, which are generated at an output 424 of the pre-filter adaptation circuit 420 and coupled to an input 426 of the pre-filter 362.

The pre-filter adaptation circuit 420 implements the equation (1) correspondingly for each tap $f(0), f(1), \ldots, f(n)$ of the pre-filter. Accordingly, the pre-filter adaptation error $e_k$ at the output 418 is generated by subtracting the scaled decision from the slicer input of decision block 374, as given by equations (2), (3) and (4). The adaptation takes the ADC digital samples and the adaptation error $e_k$ to generate the adaptation error gradient and update the pre-filter taps. The adaptation can use various algorithms, for example using a least means squares (LMS), a signed LMS algorithm, or other adaptation algorithms, where Equation (1) is a LMS adaptation. The FFE adaptation circuit 430 adapts the coefficients of FFE 350 based on a similar set of equations as (1) to (4), using the adaptation error $e_k$ generated at the output 418 and the decisions from the low complexity detector (e.g., DFE 318) of the first stage 308 received at an input 434 to generate the adaptation error gradient and update the decision FIR taps coupled to an input 438 of the FFE 350, by using LMS or signed LMS algorithm or other adaptation algorithms. By noise shaping and partially cancelling out pre-cursor and post-cursor ISI with first partial equalization of the ISI impaired signal, and then subtracting of the estimated pre-cursor and post-cursor ISI from the filtered decisions generated by another separate detector, data can be received more accurately and at higher data rates due to the removal of a feedback loop in the ISI cancellation.

Turning now to FIG. 5, a block diagram of a feed forward equalizer of FIGS. 3 and 4 is shown. The feed forward equalizer performs the equalization by filtering its input signal based on equations similar to Equation (5). The feed forward equalizer receives the input signal $X_k$ at a first stage of a plurality of filter stages 502-506. Each filter stage comprises a delay element 508, the output of which is coupled to a multiplier circuit 510 at an input 514. Another input to the multiplier is coupled to the input 516, which corresponds to a respective one of the filter coefficients, and an output of the multiplier is generated at an output 518. The multiplier 522 is also coupled to the first filter coefficient f(0) at a first input 526 and the ADC sample $X_k$ at a second input 524, the output of which is coupled to the adder 538 as input 531. The output 518 of each of the stages is coupled to an adder circuit, where an output of the first filter stage 502 is coupled to a first input 532, an output of the second filter stage 504 is coupled to a second input 534, and an output of the last filter stage 506 is coupled to an input 536. The signal $Y_k$ is generated at an output 538 of the adder circuit 530.

Figure 6:
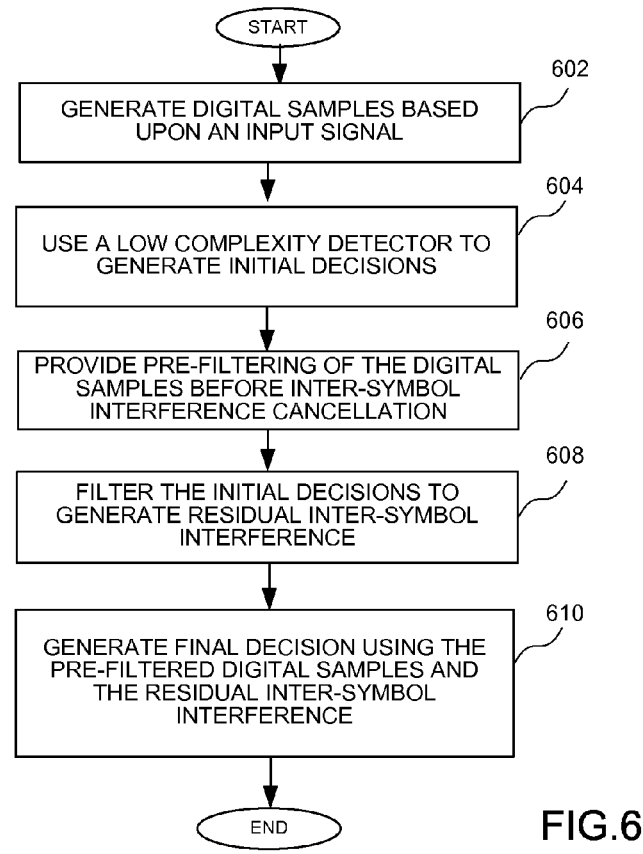
FIG. 6 is a flow chart showing a method of filtering inter-symbol interference in an integrated circuit.

Turning now to FIG. 6, a flow chart shows a method of filtering inter-symbol interference in an integrated circuit. Digital samples are generated based upon an input signal at a block 602. A low complexity detector is used to generate initial decisions at a block 604. The low complexity detector could be, for example, the FFE 312 of FIG. 3. Pre-filtering of the digital samples is provided before inter-symbol interference cancellation at a block 606. For example, the pre-filtering could be performed by pre-filter 362. The initial decisions are filtered to generate residual inter-symbol interference at a block 608. Final decision are generated using the pre-filtered digital samples and the residual inter-symbol interference at a block 610. That is, the residual inter-symbol interference is subtracted from the pre-filtered digital samples, such as by using the subtractor circuit 358 of FIG. 3.

Figure 7:
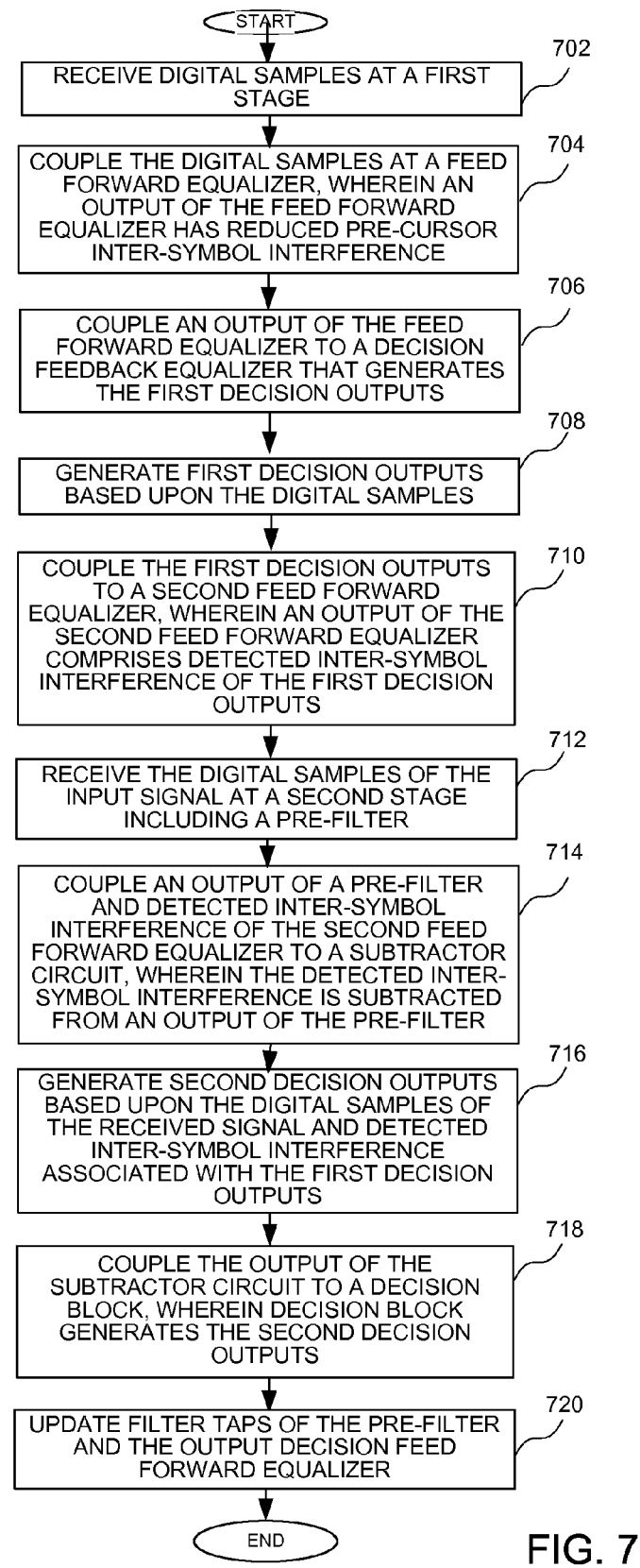
FIG. 7 is a flow chart showing another method of filtering inter-symbol interference in an integrated circuit.

Turning now to FIG. 7, a flow chart shows another method of filtering inter-symbol interference in an integrated circuit. Digital samples are received at a first stage at a block 702. The digital samples are coupled to a feed forward equalizer, wherein an output of the feed forward equalizer has reduced pre-cursor inter-symbol interference at a block 704. The feed forward equalizer could be FFE 312 of FIG. 3, for example. An output of the feed forward equalizer is coupled to a decision feedback equalizer that generates the first decision outputs at a block 706. The decision feedback equalizer could be DFE 318, which cancels out post-cursor ISI. First decision outputs are generated at an output of the decision feedback equalizer based upon the digital samples at a block 708.

The first decision outputs are coupled to a second feed forward equalizer, wherein an output of the second feed forward equalizer comprises detected inter-symbol interference using the first decision outputs at a block 710. The second feedback equalizer could be FFE 350, for example. The digital samples of the input signal are also received at a second stage including a pre-filter at a block 712. The output of a pre-filter and detected inter-symbol interference of the second feed forward equalizer are coupled to a subtractor circuit, wherein the detected inter-symbol interference (associated with both pre-cursor and post-cursor ISI) is subtracted from an output of the pre-filter at a block 714. Second decision outputs are generated based upon the digital samples of the received signal and detected inter-symbol interference associated with the first decision outputs at a block 716. The output of the subtractor circuit is coupled to a decision block, wherein decision block generates the second decision outputs at a block 718. Finally, filter taps of the pre-filter and the output decision feed forward equalizer are updated at a block 720. For example, updating of the filter taps can be performed by the adaptation stage 402.

The various elements of the methods of FIGS. 6 and 7 may be implemented using the circuits of FIGS. 1-5 and 8-10 as described, or using some other suitable circuits. While specific elements of the method are described, it should be understood that additional elements of the method, or additional details related to the elements, could be implemented according to the disclosure of FIGS. 1-5 and 8-10.

Figure 8:
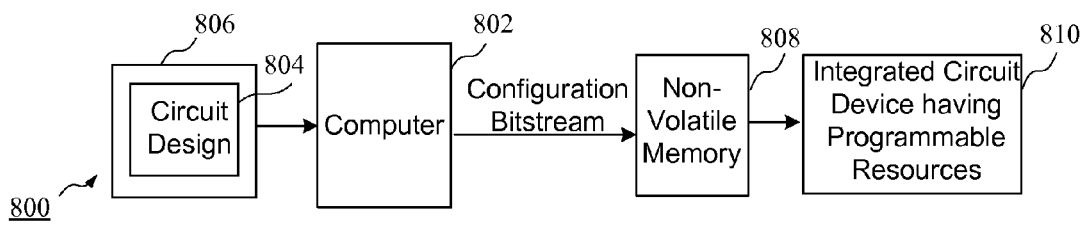
FIG. 8 is a block diagram of a system for programming a device having programmable resources.

Turning now to FIG. 8, a block diagram of a system for programming a device having programmable resources according to an embodiment is shown. In particular, a computer 802 is coupled to receive a circuit design 804 from a memory 806, and generates a configuration bitstream that is stored in the non-volatile memory 806. As will be described in more detail below, the circuit design may be a high level design, such as a circuit design defined in a hardware description language (HDL). Also, the computer may be configured to run software that generates a configuration bitstream that is stored in the non-volatile memory 808 and provided to an integrated circuit 810 that may be a programmable integrated circuit, such as the integrated circuit described below in reference to FIG. 9. As will be described in more detail below, bits of the configuration bitstream are used to configure programmable resources of the integrated circuit.

Figure 9:
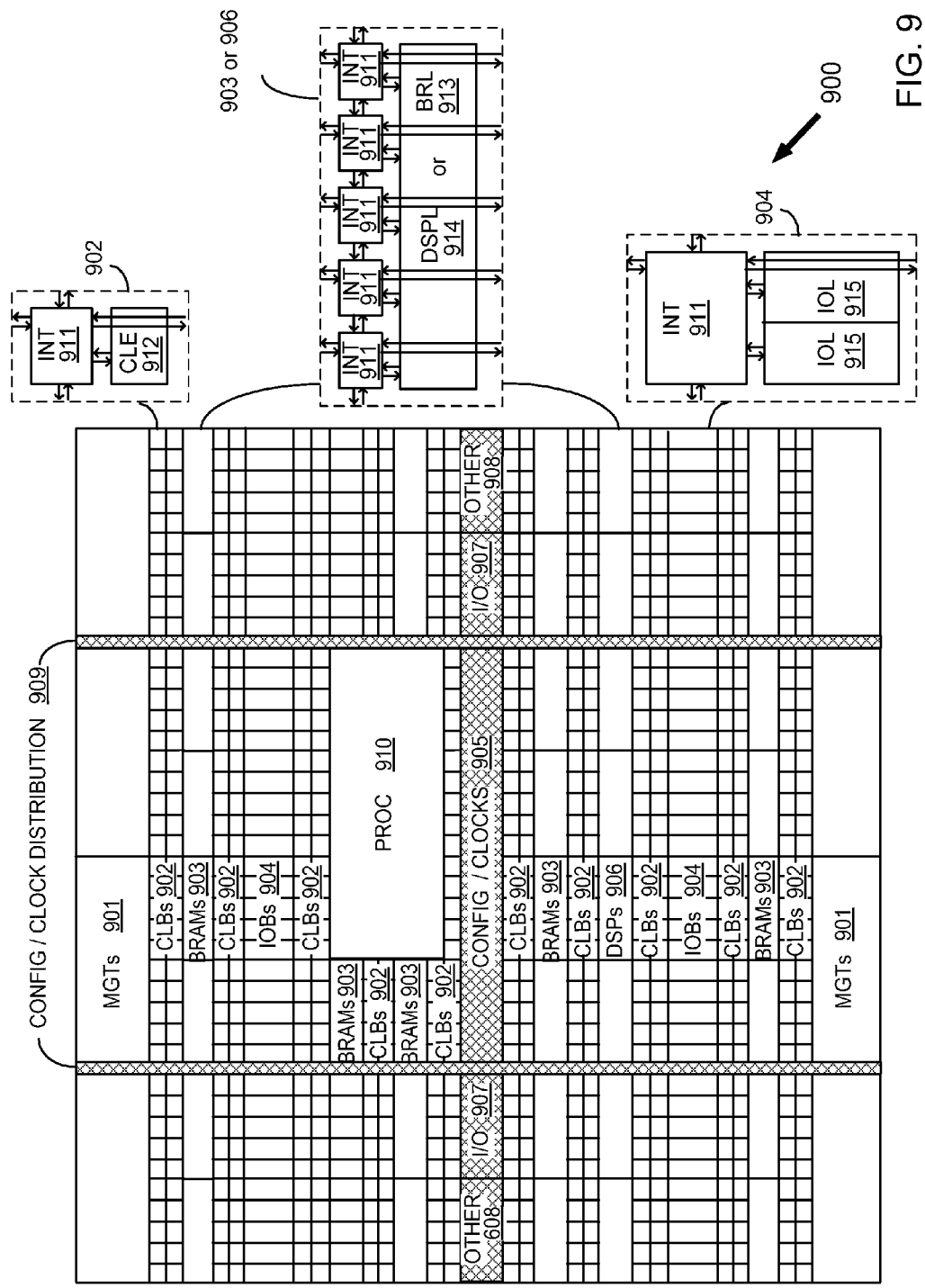
FIG. 9 is a block diagram of a device having programmable resources.

Turning now to FIG. 9, a block diagram of a device having programmable resources including the circuits of FIGS. 1-7 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 9 comprises an FPGA architecture 900 having a large number of different programmable tiles including multi-gigabit transceivers (MGTs) 901, CLBs 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907 (e.g., configuration ports and clock ports), and other programmable logic 908 such as digital clock managers, analog-to-digital converters, system monitoring logic, and so forth. Some FPGAs also include dedicated processor blocks (PROC) 910, which may be used to implement a software application, for example.

In some FPGAs, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 9.

For example, a CLB 902 may include a configurable logic element (CLE) 912 that may be programmed to implement user logic plus a single programmable interconnect element 911. A BRAM 903 may include a BRAM logic element (BRL) 913 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 906 may include a DSP logic element (DSPL) 914 in addition to an appropriate number of programmable interconnect elements. An 10B 904 may include, for example, two instances of an input/output logic element (IOL) 915 in addition to one instance of the programmable interconnect element 911. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 909 extending from this column are used to distribute the clocks and configuration signals across the breadth of the FPGA. Some FPGAs utilizing the architecture illustrated in FIG. 9 include additional logic blocks that disrupt the regular columnar structure making up a large part of the FPGA. The additional logic blocks may be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear in order to facilitate the efficient implementation of user logic. While the embodiment of FIG. 9 relates to an integrated circuit having programmable resources, it should be understood that the circuits and methods set forth in more detail below could be implemented in any type of ASIC.

Figure 10:
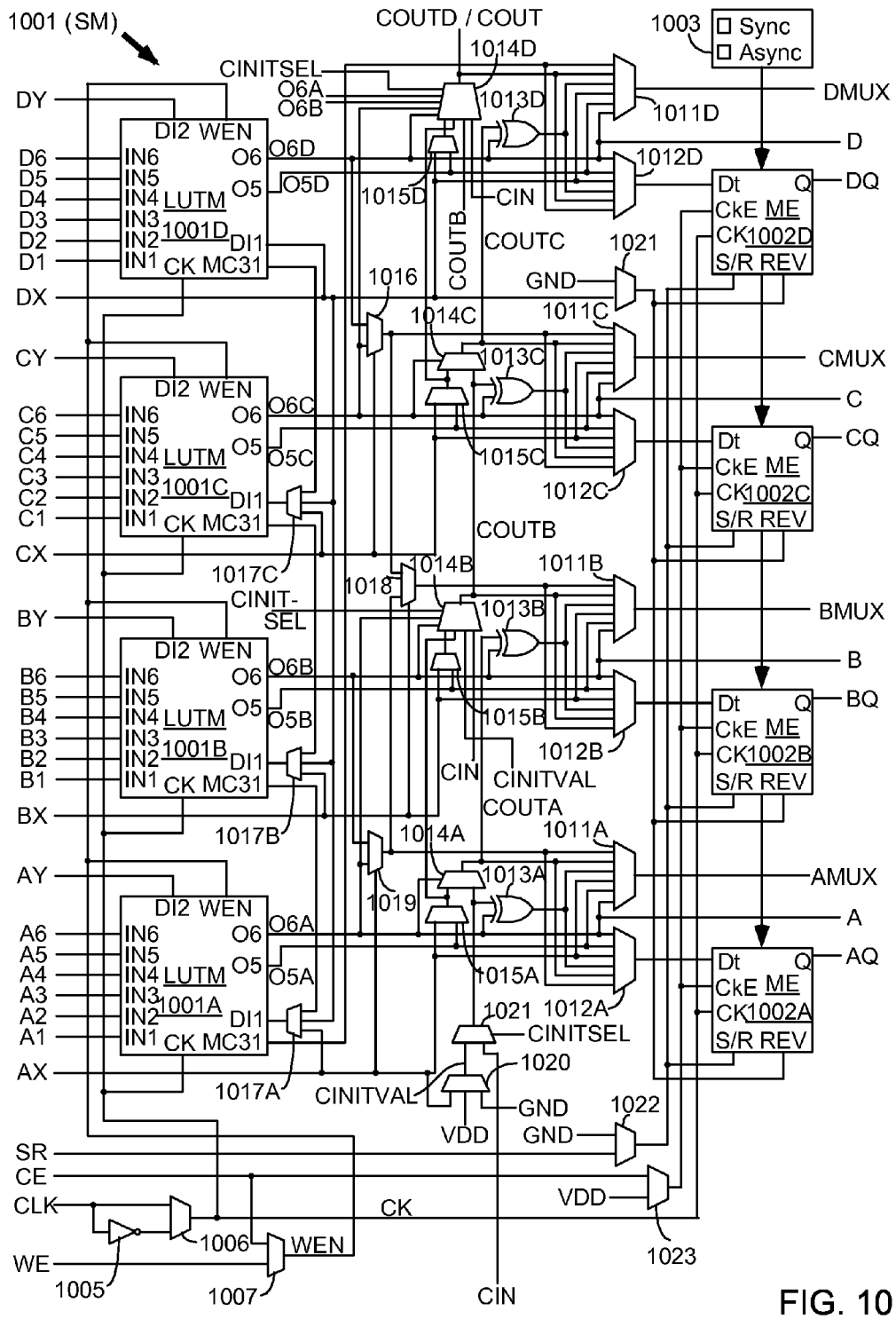
FIG. 10 is a block diagram of a configurable logic element of the device of FIG. 9.

Turning now to FIG. 10, a block diagram of a configurable logic element of the device of FIG. 9 is shown. In particular, FIG. 10 illustrates in simplified form a configurable logic element of a configuration logic block 902 of FIG. 9. In the embodiment of FIG. 10, slice M 1001 includes four lookup tables (LUTMs) 1001A-1001D, each driven by six LUT data input terminals A1-A6, B1-B6, C1-C6, and D1-D6 and each providing two LUT output signals O5 and O6. The O6 output terminals from LUTs 1001A-1001D drive slice output terminals A-D, respectively. The LUT data input signals are supplied by the FPGA interconnect structure via input multiplexers, which may be implemented by programmable interconnect element 1011, and the LUT output signals are also supplied to the interconnect structure. Slice M also includes: output select multiplexers 1011A-1011D driving output terminals AMUX-DMUX; multiplexers 1012A-1012D driving the data input terminals of memory elements 1002A-1002D; combinational multiplexers 1016, 1018, and 1019; bounce multiplexer circuits 1022-1023; a circuit represented by inverter 1005 and multiplexer 1006 (which together provide an optional inversion on the input clock path); and carry logic having multiplexers 1014A-1014D, 1015A-1015D, 1020-1021 and exclusive OR gates 1013A-1013D. All of these elements are coupled together as shown in FIG. 10. Where select inputs are not shown for the multiplexers illustrated in FIG. 10, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 10 for clarity, as well as from other selected figures herein.

In the pictured embodiment, each memory element 1002A-1002D may be programmed to function as a synchronous or asynchronous flip-flop or latch. The selection between synchronous and asynchronous functionality is made for all four memory elements in a slice by programming Sync/Asynch selection circuit 1003. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1002A-1002D are clocked by a clock signal CK, which may be provided by a global clock network or by the interconnect structure, for example. Such programmable memory elements are well known in the art of FPGA design. Each memory element 1002A-1002D provides a registered output signal AQ-DQ to the interconnect structure. Because each LUT 1001A-1001D provides two output signals, O5 and O6, the LUT may be configured to function as two 5-input LUTs with five shared input signals (IN1-IN5), or as one 6-input LUT having input signals IN1-IN6.

In the example of FIG. 10, each LUTM 1001A-1001D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1017A-1017C for LUTs 1001A-1001C), or to the two 32-bit RAMs via input terminals DI1 and DI2. RAM write operations in the LUT RAMs are controlled by clock signal CK from multiplexer 1006 and by write enable signal WEN from multiplexer 1007, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1001A may also be provided to the general interconnect structure for shift register chaining, via output select multiplexer 1511D and CLE output terminal DMUX. Accordingly, the circuits and methods set forth above may be implemented in a device such as the devices of FIGS. 9 and 10, or any other suitable device.

It can therefore be appreciated that new circuits for and methods of filtering inter-symbol interference in an integrated circuit has been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A circuit for filtering inter-symbol interference in an integrated circuit, the circuit comprising:
   a first stage coupled to receive digital samples of an input signal, wherein the first stage generates first decision outputs based upon the digital samples of the input signal; and
   a second stage coupled to receive the digital samples of the input signal;
   wherein the second stage comprises a pre-filter coupled to an output of a delay element for receiving delayed digital samples, and a filter receiving the first decision outputs and generating filtered decisions, the delay element aligning an output of the pre-filter with the filtered decisions; and
   wherein the second stage generates second decision outputs based upon the digital samples of the input signal that are filtered before inter-symbol interference cancellation and detected inter-symbol interference associated with the first decision outputs.

2. The circuit of claim 1, wherein the first stage comprises a feed forward equalizer coupled to receive the digital samples, wherein an output of the feed forward equalizer has reduced pre-cursor inter-symbol interference.

3. The circuit of claim 2, wherein an output of the feed forward equalizer is coupled to a decision feedback equalizer that generates the first decision outputs.

4. The circuit of claim 3, wherein the decision feedback equalizer comprises a single-tap decision feedback equalizer.

5. The circuit of claim 1, wherein the filter of the second stage comprises a feed forward equalizer coupled to receive the first decision outputs, and the filtered decisions generated by the feed forward equalizer comprise the detected inter-symbol interference associated with the first decision outputs.

6. The circuit of claim 5, further comprising a subtractor circuit coupled to receive an output of the pre-filter and the detected inter-symbol interference of the feed forward equalizer, wherein the detected inter-symbol interference is subtracted from the output of the pre-filter.

7. The circuit of claim 6, further comprising a decision block coupled to an output of the subtractor circuit, wherein the decision block generates the second decision outputs.

8. A circuit for filtering inter-symbol interference in an integrated circuit, the circuit comprising:
- a decision feedback equalizer coupled to receive digital samples of an input signal, wherein the decision feedback equalizer generates first decision outputs at an output of a first decision block based upon the digital samples;
- a multiplier coupled to the output of the first decision block of the decision feedback equalizer and a scalar value;
- a feed forward equalizer coupled to receive the first decision outputs and to generate detected inter-symbol interference associated with the first decision outputs;
- a pre-filter coupled to receive delayed digital samples of the input signal;
- a first subtractor circuit coupled to an output of the pre-filter and an output of the feed forward equalizer; and
- a second decision block coupled to an output of the subtractor circuit, the second decision block generating second decision outputs.

9. The circuit of claim 8, wherein the decision feedback equalizer comprises a single-tap decision feedback equalizer.

10. The circuit of claim 8, further comprising a second feed forward equalizer coupled to receive the digital samples of the received signal, wherein an output of the second feed forward equalizer is coupled to the decision feedback equalizer.

11. The circuit of claim 8, further comprising a second subtractor circuit coupled to an output of the first subtractor circuit, the second subtractor circuit generating an error signal.

12. The circuit of claim 11, further comprising a pre-filter adaptation circuit coupled to receive the error signal and the delayed digital samples, wherein the pre-filter adaptation circuit provides adaptation control signals to the pre-filter circuit.

13. The circuit of claim 11, further comprising a feed forward equalizer adaptation circuit coupled to receive the error signal and the first decision outputs, wherein the feed forward equalizer adaptation circuit provides adaptation control signals to the feed forward equalizer.

14. A method of filtering inter-symbol interference in an integrated circuit, the method comprising:
- receiving digital samples of an input signal at a first stage;
- generating first decision outputs of the first stage based upon the digital samples;
- generating filtered decisions of the first decision outputs;
- receiving the digital samples of the input signal at a second stage;
- coupling the digital samples to a delay element to generate delayed digital samples;
- coupling the delayed digital samples to a pre-filter of the second stage, wherein the delay element aligns an output of the pre-filter that is filtered before inter-symbol interference cancellation with the filtered decisions of the first decision outputs; and
- generating second decision outputs based upon the delayed digital samples of the input signal and detected inter-symbol interference associated with the filtered decisions of the first decision outputs.

15. The method of claim 14, further comprising receiving the digital samples at a feed forward equalizer, wherein an output of the feed forward equalizer has reduced pre-cursor inter-symbol interference.

16. The method of claim 15, further comprising coupling an output of the feed forward equalizer to a decision feedback equalizer that generates the first decision outputs.

17. The method of claim 14, further comprising coupling the first decision outputs to a feed forward equalizer, wherein an output of the feed forward equalizer comprises the detected inter-symbol interference associated with the first decision outputs.

18. The method of claim 17, further comprising coupling an output of the pre-filter and the detected inter-symbol interference associated with the first decision outputs to a subtractor circuit, wherein the detected inter-symbol interference is subtracted from an output of the pre-filter.

19. The circuit of claim 18, further comprising coupling an output of the subtractor circuit to a decision block, wherein the decision block generates the second decision outputs.

* * * * *